Oct. 8, 1963    G. A. OLIVER    3,106,637
ARITHMETIC AND LOGIC SYSTEM
Filed Dec. 31, 1957    9 Sheets-Sheet 1
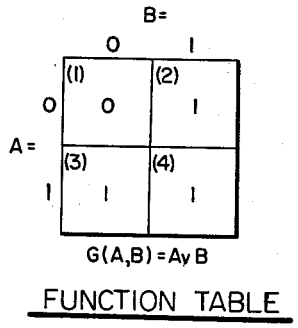
FUNCTION TABLE
*Fig.1*
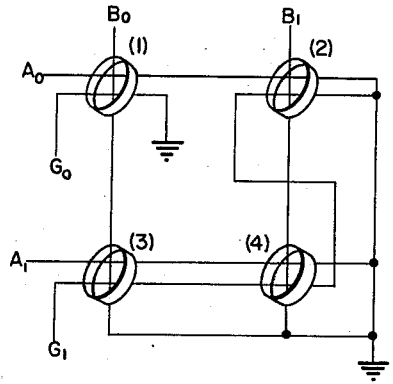
SCHEMATIC EQUIVALENT
OF FUNCTION TABLE
*Fig.2*
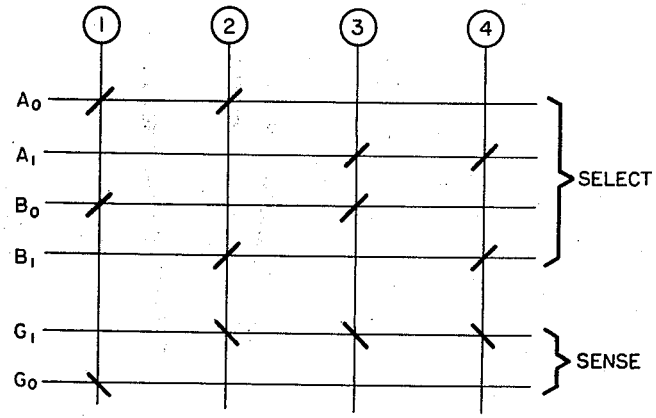
MIRROR CHART EQUIVALENT
OF FUNCTION TABLE
*Fig.3*
INVENTOR.
GLENN A. OLIVER
BY
ATTORNEY

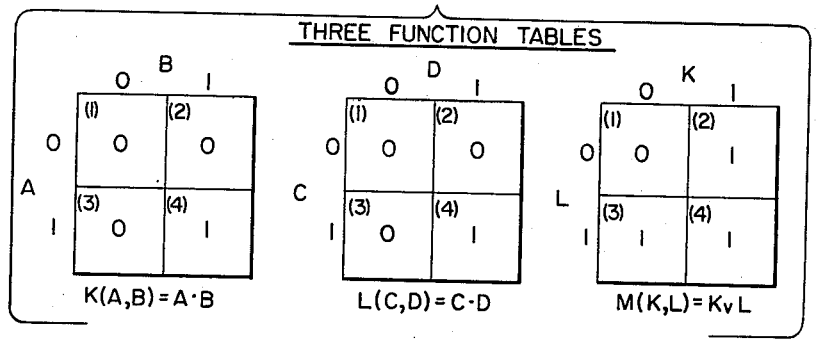
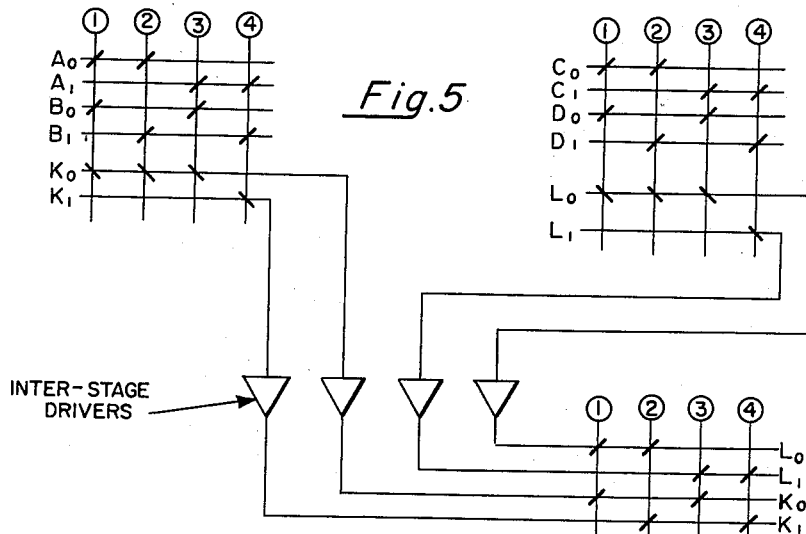
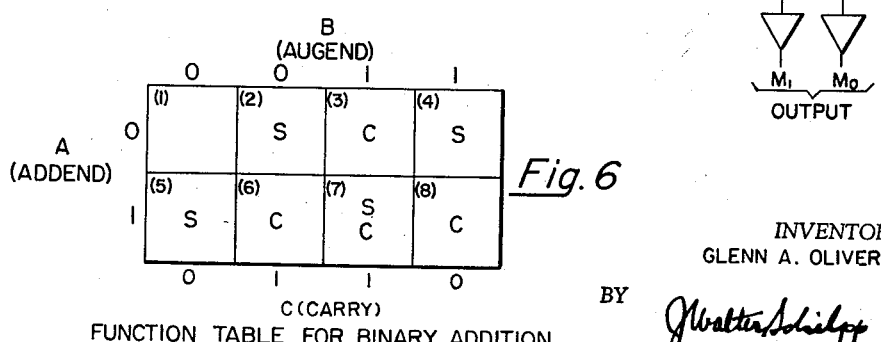

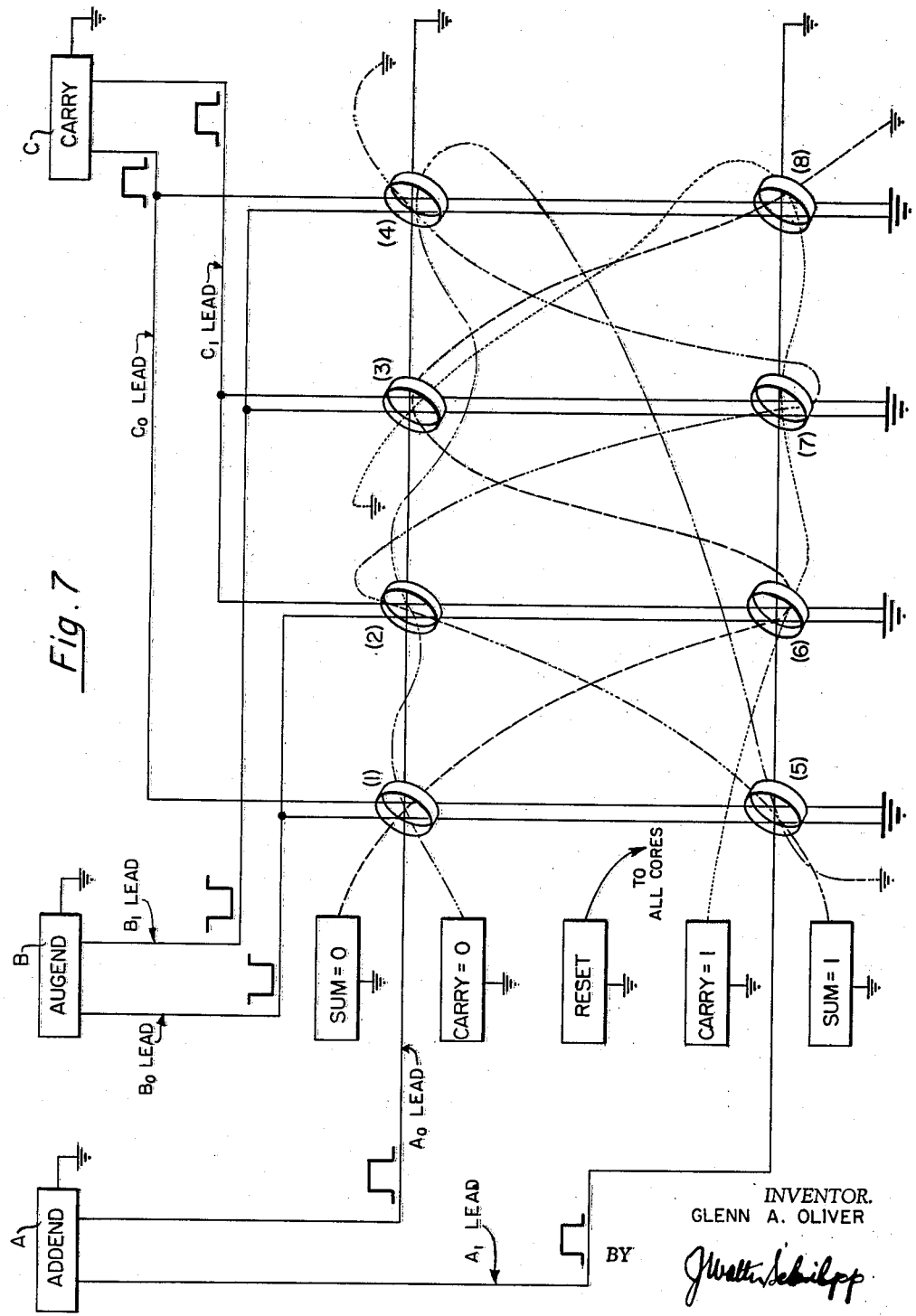

Oct. 8, 1963  G. A. OLIVER  3,106,637
ARITHMETIC AND LOGIC SYSTEM
Filed Dec. 31, 1957  9 Sheets-Sheet 4
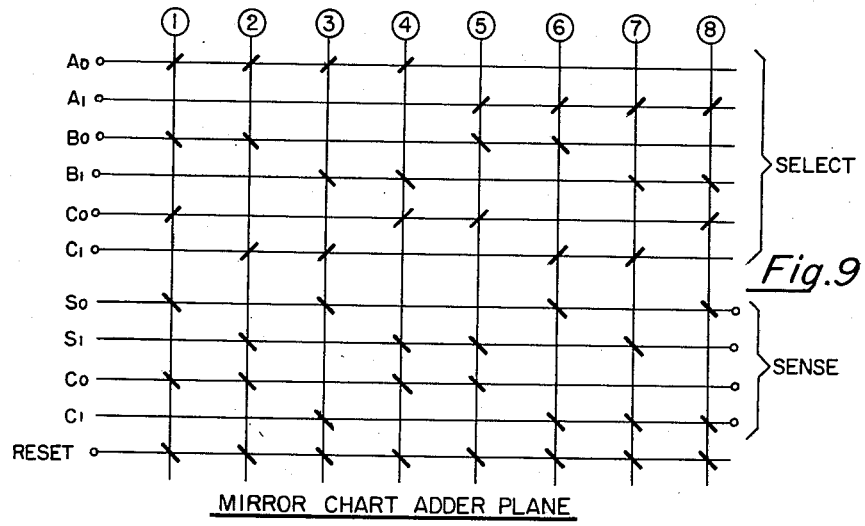
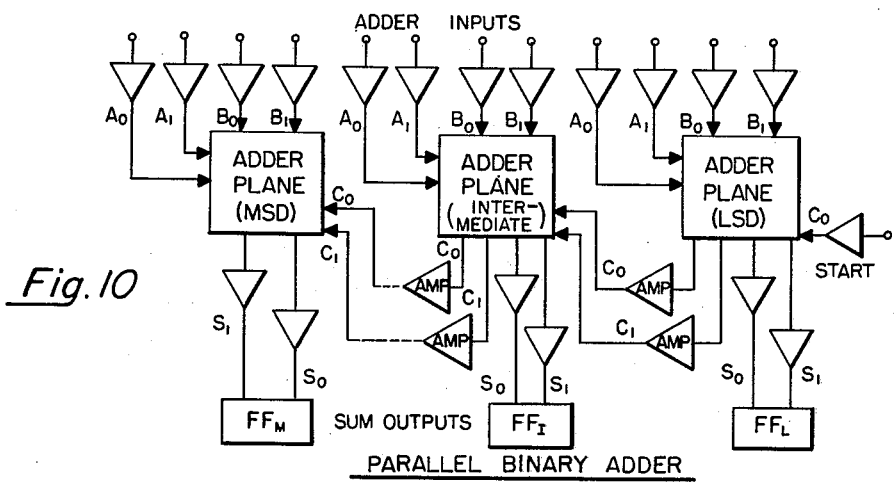
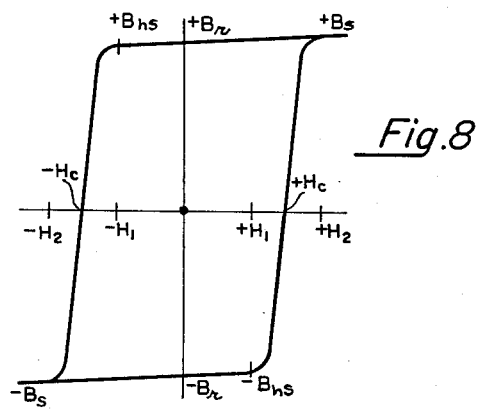
INVENTOR.
GLENN A. OLIVER
BY
ATTORNEY Oct. 8, 1963 G. A. OLIVER 3,106,637
ARITHMETIC AND LOGIC SYSTEM
Filed Dec. 31, 1957 9 Sheets-Sheet 5

FUNCTION TABLE FOR COMBINED ADDITION
& SUBTRACTION INVOLVING FOUR (4) BINARY VARIABLES

D = ADD OR SUBTRACT.
S = SUM OR DIFFERENCE.
C = CARRY OR BORROW.

*Fig. 13*

FUNCTION TABLE FOR SUBTRACTION (A-B)

D = DIFFERENCE (A-B)
R = BORROW

*Fig. 12*

FUNCTION TABLE FOR COMPARISON OF TWO (2) BINARY NUMBERS.

INVENTOR.
GLENN A. OLIVER
BY
ATTORNEY

Oct. 8, 1963  G. A. OLIVER  3,106,637
ARITHMETIC AND LOGIC SYSTEM
Filed Dec. 31, 1957  9 Sheets-Sheet 7
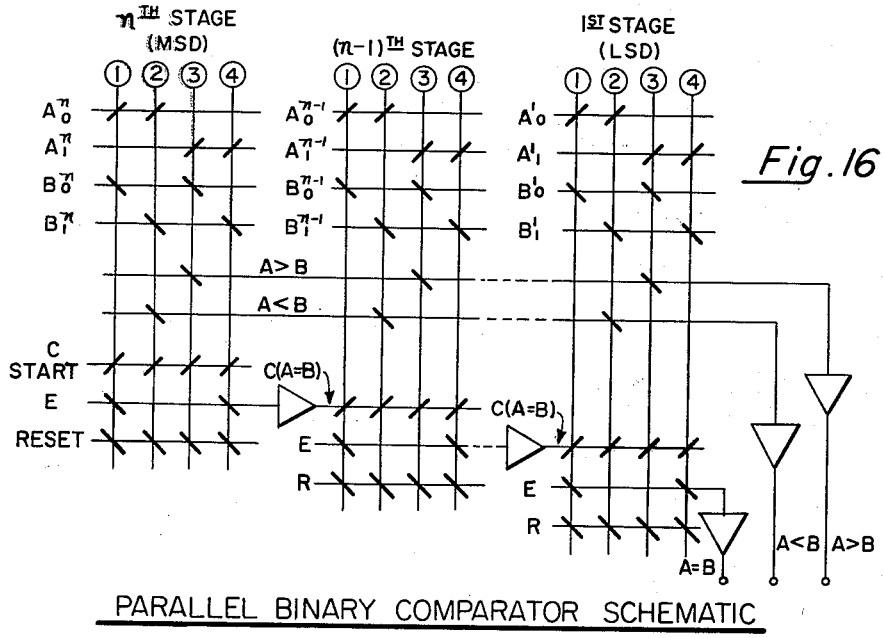
PARALLEL BINARY COMPARATOR SCHEMATIC
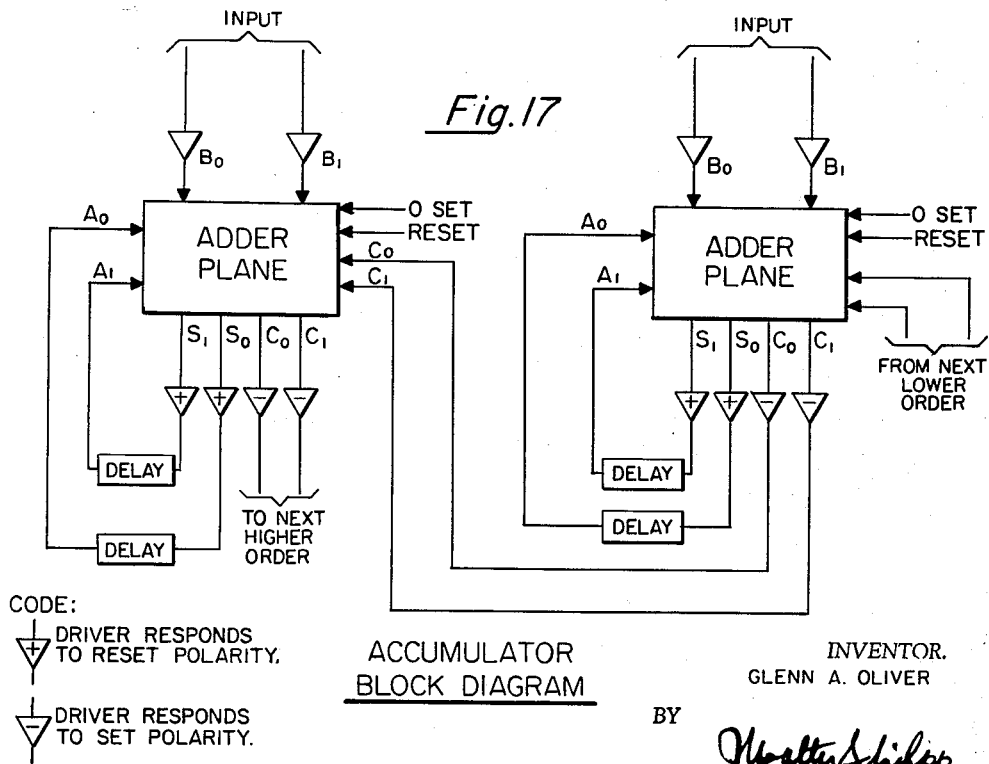
Fig. 17
ACCUMULATOR BLOCK DIAGRAM
CODE:
⊥ DRIVER RESPONDS TO RESET POLARITY.
⊥ DRIVER RESPONDS TO SET POLARITY.
INVENTOR.
GLENN A. OLIVER
BY
J. Walter Schilpp
ATTORNEY Oct. 8, 1963

G. A. OLIVER 3,106,637

ARITHMETIC AND LOGIC SYSTEM

Filed Dec. 31, 1957

BIQUINARY ADDITION

"QUI" ADDITION TABLE

|   | B |   |   |   |   |   |
|---|---|---|---|---|---|---|
|   |   | 0 | 1 | 2 | 3 | 4 |
| A | 0 | (1) 0 | (2) 1 | (3) 2 | (4) 3 | (5) 4 |
|   | 1 | (6) 1 | (7) 2 | (8) 3 | (9) 4 | (10) 0 |
|   | 2 | (11) 2 | (12) 3 | (13) 4 | (14) 0 | (15) 1 |
|   | 3 | (16) 3 | (17) 4 | (18) 0 | (19) 1 | (20) 2 |
|   | 4 | (21) 4 | (22) 0 | (23) 1 | (24) 2 | (25) 3 |

} d = 0

|   |   | 0 | 1 | 2 | 3 | 4 |
|---|---|---|---|---|---|---|
| A | 0 | (26) 1 | (27) 2 | (28) 3 | (29) 4 | (30) 0 |
|   | 1 | (31) 2 | (32) 3 | (33) 4 | (34) 0 | (35) 1 |
|   | 2 | (36) 3 | (37) 4 | (38) 0 | (39) 1 | (40) 2 |
|   | 3 | (41) 4 | (42) 0 | (43) 1 | (44) 2 | (45) 3 |
|   | 4 | (46) 0 | (47) 1 | (48) 2 | (49) 3 | (50) 4 |

} d = 1

→ Carry to "BI" Addition table.

"BI" ADDITION TABLE

|   | B |   |   |   |
|---|---|---|---|---|
|   |   | 0 | 0 | 5 | 5 |
| A | 0 | (1) 0 | (2) 5 | (3) d 0 | (4) 5 |
|   | 5 | (5) 5 | (6) d 0 | (7) d 5 | (8) d 0 |

C

A,B = "BI" Part of addend & augend.

C = carry from "QUI" addition.

d = decimal carry to next higher order "QUI" plane.

INVENTOR.
GLENN A. OLIVER
BY
*Walter Schilpp*
ATTORNEY

INVENTOR.
GLENN A. OLIVER

United States Patent Office 3,106,637
Patented Oct. 8, 1963

3,106,637
ARITHMETIC AND LOGIC SYSTEM
Glenn A. Oliver, Ardmore, Pa., assignor to Burroughs Corporation, Detroit, Mich., a corporation of Michigan
Filed Dec. 31, 1957, Ser. No. 706,372
12 Claims. (Cl. 235—175)

This invention relates to a new electronic system for performing arithmetic and logical operations.

The new system utilizes the function-table approach and is applicable to the function of two (or more) variables and to number systems using any one of several radices including the radix 2 of the binary system.

As is known, a function table is an ordered listing of the values of a function with respect to the values of the arguments or independent variables. A function table may take several forms depending upon the number of independent variables, their range, the interval between values in the range, and the intended use of the table.

The system of the present invention, about to be described, is based on the concept of a function table of two dimensions and may be usefully employed for binary, biquinary, and other arithmetic operations, including addition, subtraction, multiplication, and division. The system may also be used for comparison, code translation and other purposes.

The use of magnetic cores in arithmetic and logic systems is well known, the basic element being a core, usually tape wound, about which one or more windings are placed. In conventional systems, logical operations are performed in a step-wise fashion using several cores, each generating sub-functions of the desired logical function for all but the most elementary operation. The philosophy of these systems demands a time ordering of input variables and of the sub-functions generated by each core with respect to each other and with respect to a clock (power) pulse. Stated another way, conventional magnetic core circuits for binary (or other) arithmetic process have ordinarily operated in the manner of a shift register in which each stage consists of one or more cores interconnected to perform a portion of the total logical operation required of the device and in which the sum or other final result is achieved by a combining operation performed in the final stage.

The conventional type of arithmetic magnetic-core circuit referred to above suffers from a number of disadvantages. In the first place, the operation is required to be sequential. That is, a given step cannot be performed until all related prior steps have been completed, and as a consequence there is a significant time delay between input and output. Secondly, the circuit is required to be synchronously operated. That is, the operation is required to be controlled by a clock frequency and the operating speed is, consequently, limited to some integral sub-multiple of the clock frequency. Thirdly, the output of the circuit is available at but one instant during an entire operation. Fourthly, the current-driving equipment is required to provide full switching current because of the principles upon which the circuits are designed. Fifthly, because of the relatively large number of elements required, and because of the timing problems involved in the carry propagation, the shift register form of binary adder is not well suited for parallel operation, which is well known to be ordinarily faster than serial operation. Lastly, because of the large number of elements and their nature, the shift register form of binary adder is not well suited for automatic fabrication.

The present invention provides a matrix type of magnetic-core arithmetic element or unit-circuit which avoids most, if not all, of the disadvantages enumerated above. In the first place, most operations are completed in one step rather than in several or many. Secondly, no clock pulse is required to operate the matrix element or unit-circuit and consequently the operation takes place at the maximum possible rate, there being a minimum of delay between input and output. Thirdly, output signals are obtainable during either data input or reset input, or both, depending upon the external circuitry. During the interval between input and reset, the correct result is stored in the matrix in a manner similar to that in which information is stored in a magnetic-core memory. Fourthly, half-select operating principles (the term "half-select" is later defined) are used throughout, thus simplifying considerably the problems relating to current drivers, material selection and associated circuitry. Fifthly, because of the number of components required is a minimum, and because of the absence of timing problems, the circuit is well suited for parallel operation. Moreover, increased reliability is achieved because of the minimum amount of equipment required and because only one step of operation is necessary in order to obtain the result. And lastly, due to the small number of components required and to the nature of these components, the matrix element or unit-circuit of the present invention is ideally suited for automatic fabrication.

The basic arithmetic element or unit-circuit of the present invention is a core matrix comprising solely magnetic cores, core windings, and conductive interconnections. There are no diodes or resistors connected between the individual cores of the matrix. Such a matrix will be referred to hereinafter as a core plane. Each core in the core plane corresponds to an entry position in the function table. The core plane is provided with a set of selection windings and the scheme of the windings and the magnitude of the driving currents are so chosen that one, and only one, core in the plane may be switched at a time. For example, a simple half-select coincident current scheme is appropriate. With this scheme, the selection windings corresponding to the values of the arguments, i.e., the variables, are current driven to produce in the core a magnetizing force of either plus or minus $H_s/2$ or of zero, where $H_s$ is the magnetizing force required to switch the core. The current magnitude required to achieve a force of $H_s$ will hereinafter be termed $I$, and the current magnitude required to achieve a force of $H_s/2$ will be termed $I/2$. Single turn windings will be presumed, although, of course, multiple turn windings may be used in order to reduce the drive current requirements or to increase the output voltages. The core in the core plane selected to be switched corresponds to that entry position in the function table defined by the values of the argument. All of the cores in the plane are threaded by at least one sense winding, and a voltage is induced in the sense winding or windings associated therewith whenever one of the cores of the plane is switched. The voltage developed in the sense winding is the output voltage and represents the function value sought. The amplified output of one core plane is used as the input to the next core plane. The input to the next core plane occurs before the driving currents representative of the values of the arguments of that next core plane have terminated. Thus, chains of arithmetic or logical operations may be performed without references to a clock source.

While the foregoing indicates generally the nature of the present invention, the invention will be best understood from the following detailed description taken together with the drawing wherein:

FIG. 1 shows a function table for a logical OR operation;

FIG. 2 shows schematically a core plane for performing the logical OR operation of FIG. 1;

FIG. 3 is a mirror chart of the core plane shown schematically in FIG. 2;

FIG. 4 shows a group of function tables for performing the logical operation A AND B OR C AND D;

FIG. 5 is a mirror-chart showing of a group of core planes for performing the logical function of FIG. 4;

FIG. 6 is a function table for binary addition;

FIG. 7 is a schematic and diagrammatic showing of a core plane for performing binary addition;

FIG. 8 is an idealized B—H loop for the type of core preferably used in the core plane;

FIG. 9 shows in mirror-chart form a core plane for binary addition;

FIG. 10 is a block diagram of a parallel binary adder;

FIG. 11 is a graph showing the time relationship among the pulses applied to a core plane;

FIG. 12 is a function table for binary subtraction;

FIG. 13 is a function table for combined binary addition and subtraction;

FIG. 15 is a function table for binary comparison;

FIG. 16 is a mirror-chart showing of a parallel binary comparator;

FIG. 17 is a diagram of an accumulator;

FIG. 18 is a function table for biquinary addition; and

Figure 14:
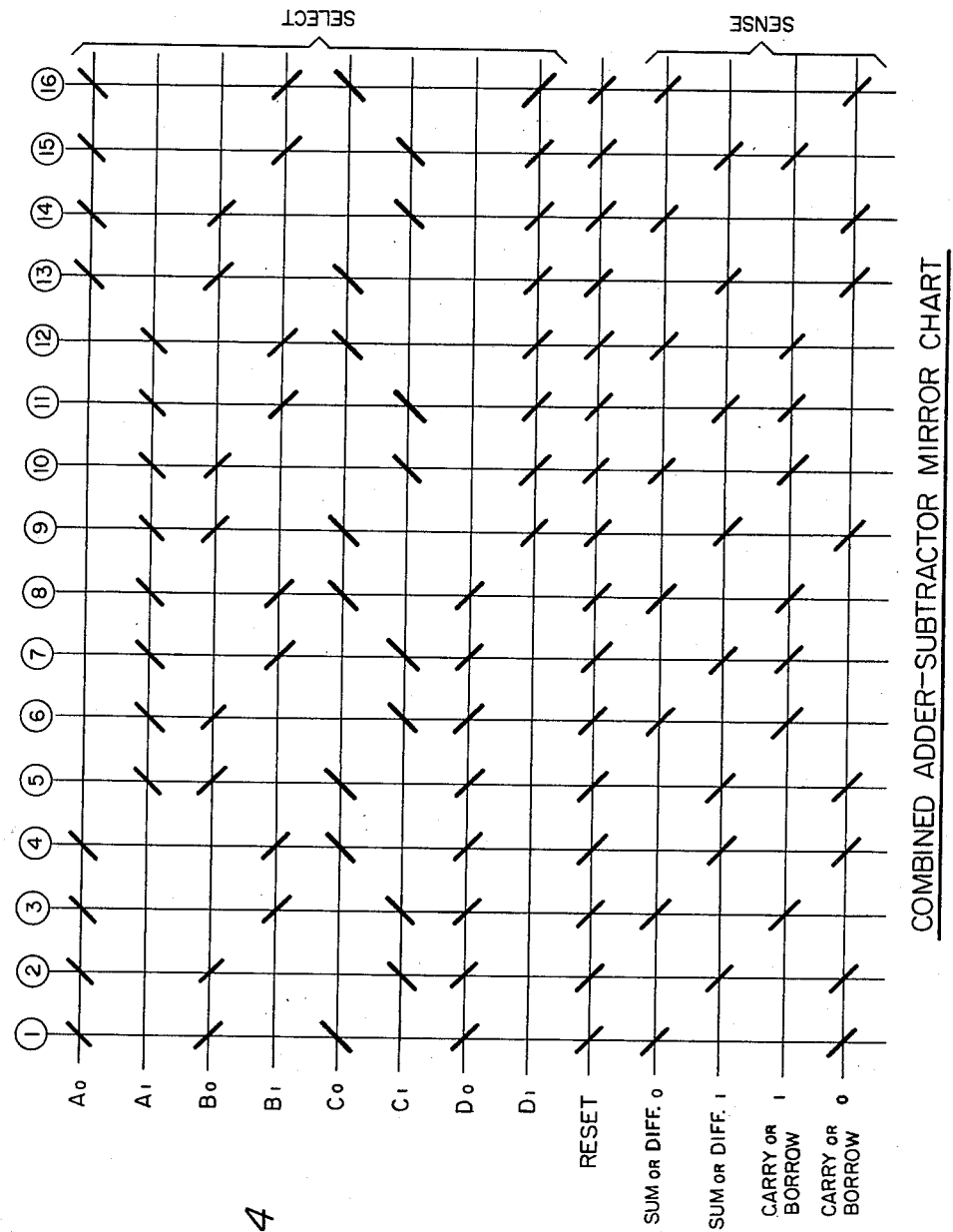
FIG. 14 is a mirror-chart showing of a core plane for performing binary addition and/or subtraction.

Referring now to FIG. 1 there is shown a function table for a logical OR operation for the variables A and B. This table comprises four blocks identified as (1), (2), (3) and (4). The values of the variables A and B are shown outside the blocks. The value of the function is shown in the center of each block. The table in FIG. 1 tells us that the function G of the variables A and B for the logical OR operation is as follows:

| G = | When | Block No. |
|---|---|---|
| 0 | A=0 and B=0 | (1) |
| 1 | A=0 and B=1 | (2) |
| 1 | A=1 and B=0 | (3) |
| 1 | A=1 and B=1 | (4) |

In FIG. 2 is shown schematically a core plane for performing the logical OR operation represented in the function table of FIG. 1. It will be seen that there is one core for each block of the function table, the cores carrying the same identifying numbers (1), (2), (3) and (4) as the blocks. Each core of the top row is threaded by an $A_0$ winding; and each core of the bottom row is threaded by an $A_1$ winding. Each core of the left-hand column is threaded by a $B_0$ winding; and each core of the right-hand column is threaded by a $B_1$ winding.

Assume that A=0 and B=1. In this case, a current pulse of half-select value $I/2$ is sent through winding $A_0$ and through winding $B_1$ and, in response thereto, core (2) will switch since it alone receives a total current (I) sufficient to switch the core. It is assumed that all the cores were initially in the cleared or "0" state and that the switching of core (2) put it in the "1" state. This corresponds to the function value "1" shown in the center of block (2) of the function table of FIG. 1. When core (2) switched, an output pulse was developed in the sense winding $G_1$ indicating a function value of "1."

If, instead of the assumption made above that A=0 and B=1, it is assumed that A=0 and B=0, then a total current (I) will be driven only through core (1). Core (1) will thereupon switch and an output pulse will appear on sense winding $G_0$ indicating a function of value of "0."

In FIG. 3 is shown a mirror diagram of the core plane of FIG. 2. In this diagram the cores (1), (2), (3) and (4) are each represented by the vertical line headed by a circle bearing the core number. The select and sense windings are represented by horizontal lines appropriately marked with identifying notations. Whether or not a winding threads a core is indicated by the presence or absence of a slant line at the junction of the vertical core line and the horizontal winding line. For example, the slant lines indicate that the $A_0$ select winding threads cores (1) and (2) but does not thread cores (3) and (4), and that the $A_1$ select winding threads cores (3) and (4) but not cores (1) and (2). Similarly, the slant lines indicate that the sense winding $G_1$ threads cores (2), (3) and (4) but not core (1). It will be noted that some of the slant lines in FIG. 3 slope from top right to bottom left while others slope from top left to bottom right. The significance of the two different slopes will be understood by considering the slant line to be a double-surfaced mirror, that is, having reflecting surfaces on each face. Thus, at the intersection of the core (1) line and the $A_0$ select winding line, the mirror will reflect upwardly light approaching from the left and will reflect downwardly light approaching from the right. Applying these light-reflecting principles to electric currents and to the magnetic fields produced thereby, the slant line at the intersection of the $A_0$ select winding and core (1) tells us that current flowing from left to right in the $A_0$ select winding will produce an "upward" magnetic field at core (1), i.e., a magnetic field whose polarity may be arbitrarily designated as "upward," and that current flowing from right to left will produce a "downward" magnetic field, i.e., a magnetic field of opposite polarity.

Let us return now to the assumption first discussed in connection with FIG. 2, namely, that A=0 and B=1. Looking at the mirror chart of FIG. 3, and assuming that current in the select windings flows from left to right, we see that the $A_0$ current pulse will produce an "upward" magnetic field at cores (1) and (2) and that the $B_1$ current pulse will produce an "upward" magnetic field at cores (2) and (4). Thus, at core (2) the $A_0$ pulse of current and the $B_1$ pulse of current will produce magnetic fields which are additive. Each of these current pulses being of half-select value, the total magnetizing force will be sufficient to switch core (2). When core (2) switches, a voltage is induced in the $G_1$ sense winding to drive current from left to right. This is indicated by the negative slope of the mirror at the intersection of core (2) vertical line and the $G_1$ sense-winding horizontal line.

Assume now that it is desired to provide means for accomplishing the logical function of A AND B OR C AND D. This may be written A·B v C·D where "·" indicates AND, and "v" indicates OR. Three function tables for two variables will be required, one to form A·B, one to form C·D and a third to perform the logical OR operation. These three function tables are shown in FIG. 4. The first table represents the function K of the variables A and B in a logical AND circuit, the second represents the function L of the variables C and D in a logical AND circuit, and the third represents the function M of the variables K and L in a logical OR circuit.

The mirror diagrams of three core planes corresponding to the three function tables of FIG. 4 are shown in FIG. 5. For convenience, the core planes will be referred to by the letter which identifies its function (also its sense windings). The operation of FIG. 5 is as follows: Current pulses representing the four variables A, B, C and D are applied simultaneously to the first two (K and L) core planes. These current pulses are of half-select value $(I/2)$. Assume a case where A=B=C=1 and D=0. In such case, core (4) in the K core plane, and core (3) in the L core plane will switch, since these cores, and these cores alone, will receive full switching current (I). Voltages will be induced in the $K_1$ and $I_0$ sense windings. These voltages will be amplified in the inter-stage drivers and will drive the $K_1$ and $L_0$ selection windings in the third (M) core plane. Core (2) of the M core plane will switch and an output pulse will appear on the $M_1$ sense winding, indicating that the function of A·B v C·D, when A=B=C=1 and D=0, is "1."

Referring now to FIG. 6, there is shown a function table for binary addition. Since three variables (the addend, augend and carry) are involved, the function table comprises eight blocks, (1) to (8), inclusive. The values of the A (addend), B (augend), and C (carry) variables are shown outside the blocks. The sum and carry functions are indicated inside the blocks, the notation "S" indicating that the sum is "1" and the notation "C" indicating that the carry is "1."

FIG. 7 shows pictorially the core plane required to perform binary addition, and corresponds to the function table of FIG. 6. In FIG. 7, three pairs of input windings, one pair each from sources A, B and C, are shown for supplying current pulses $A_0$ or $A_1$, $B_0$ or $B_1$, and $C_0$ or $C_1$, to the matrix. The current pulses $A_0$ and $A_1$ from source A represent the addend digit input pulses, the current pulses $B_0$ and $B_1$ from source B represent the augend digit input pulses, and the current pulses $C_0$ and $C_1$ from source C represent the carry signals from the next lower order in a parallel adder, or from the carry memory in a serial adder. During an addition operation, one and only one of the two leads of each pair of leads from sources A, B and C, is energized. That is to say, either an $A_0$ pulse or an $A_1$ pulse, but not both, is supplied from the addend source A for any one addition operation. Similarly, there is supplied from the augend source B either a $B_0$ or a $B_1$ pulse, but not both; and from the carry source C there is supplied either a $C_0$ or a $C_1$ pulse, but not both.

The magnitude of the current pulse supplied in FIG. 7 to each input lead is $I/2$, and in the absence of any other current through the windings of the core, would put each magnetic core through which the input lead passes in its half-selected state. The polarity of the half-select current pulse $I/2$ may be either plus (+) or minus (—), as will be described.

Each of the cores used in the core planes in the present invention has a substantially rectangular hysteresis loop. More specifically, each core, preferably at least, has the following desirable characteristics: The core element has a threshold below switching will not occur; simultaneous application of at least several stimuli is possible, and their effect is algebraically additive; the switching process is reversible; the element has the property of memory; and an output signal is generated during the change of state of the element.

While some cores and thin magnetic films have these properties, I prefer to use an element of the type described and claimed in the copending application of Douglas C. Wendell, Serial No. 533,987, filed September 13, 1955, now U.S. Patent 3,005,977, entitled "Bistable State Magnetic Elements and Coupled Circuits," and assigned to the assignee of the present application. This type of element, in one form at least, consists of a short length of unannealed ultra-thin molybdenum permalloy tape wrapped around a bundle of insulated wires. The wires comprise the selection and sense windings of the core and mechanically support the core thus formed. The excellent magnetic properties of the unannealed molybdenum permalloy tape combine with the geometry of the element to yield an easily fabricated magnetic element of superior characteristics, particularly insofar as the threshold properties are concerned. Half-select operation on the major B—H loop is easily achieved.

Referring again to FIG. 7, it will be understood that the number of turns of each winding on each core is so selected with respect to the other circuit parameters that a total current of value $+I/2$ passing therethrough establishes a magnetizing force of $+H_1$ which is less, by an adequate margin of safety, than the coercive force $+H_c$ necessary to switch a core whose remanent state is $-B_r$ to its opposite state $+B_r$. This is shown in FIG. 8 where the force $+H_1$ shifts the core from its remanent point $-B_r$ to a point $-B_{hs}$ which is referred to herein as the "half-selected" state. In like manner, a total current of value $-I/2$ passing through a core winding establishes a magnetizing force $-H_1$ which is less than the coercive force $-H_c$ necessary to switch a core whose remanent state is $+B_r$ to its opposite state $-B_r$. The force $-H_1$ shifts the flux level from $+B_r$ to the half-selected point $+B_{hs}$. It will be seen that, due to the rectangular shape of the core's hysteresis loop, when a core is shifted from its remanent state to its half-selected state there is no appreciable change in flux level, and consequently, no appreciable voltage is inducted in the output windings of the core.

Table I below shows the value of the current pulse supplied to the input leads of FIG. 7 from each of the sources A, B and C for each input condition.

*Table I*

| Input condition | Drive current on each input lead |
| --- | --- |
| Addend A=0 | $A_0=I/2$; $A_1=0$. |
| Addend A=1 | $A_0=0$; $A_1=I/2$. |
| No addend signal | $A_0=0$; $A_1=0$. |
| Augend B=0 | $B_0=0$; $B_1=-I/2$. |
| Augend B=1 | $B_0=-I/2$; $B_1=0$. |
| No augend signal | $B_0=0$; $B_1=0$. |
| Carry C=0 | $C_0=I/2$; $C_1=0$. |
| Carry C=1 | $C_0=0$; $C_1=I/2$. |
| No carry signal | $C_0=0$; $C_1=0$. |

It will be noted from the above that the current pulses, when present, are of chosen polarity (in the present example positive polarity) on the A and C leads and of opposite (negative) polarity on the B leads. It will, of course, be understood that it is the polarity of the magnetizing force produced by the half-select current pulses $I/2$ rather than the polarity of the current which is the important thing, and that the polarity of the magnetizing force produced by the current pulses from source B may be made opposite to that produced by the current pulses from sources A and C either by supplying current pulses of different polarity or by reversing the core windings carrying the B pulses relative to the windings carrying the A and C pulses. For convenience of description, the half-select current pulses from augend source B are referred to herein as being of value $-I/2$ while those from sources A and C are referred to as being of value $+I/2$.

Table II below indicates, for each combination of input signals, the total current through the winding of each core of the matrix of FIG. 7 when current pulses, or portions of current pulses, from input sources A, B and C are coincident.

*Table II*

| Input condition | Core numbers of cores shown in FIG. 7 having, for each indicated input condition, the total current shown at top of column. | | | |
| --- | --- | --- | --- | --- |
| | 1 | I/2 | 0 | −I/2 |
| A B C | | | | |
| 0 0 0 | 1 | 2, 4, 5 | 8, 3, 6 | 7 |
| 0 0 1 | 2 | 3, 6, 1 | 4, 5, 7 | 8 |
| 0 1 0 | 4 | 1, 3, 8 | 2, 5, 7 | 6 |
| 0 1 1 | 3 | 2, 4, 7 | 1, 6, 8 | 5 |
| 1 0 0 | 5 | 1, 6, 8 | 2, 4, 7 | 3 |
| 1 0 1 | 6 | 2, 5, 7 | 1, 3, 8 | 4 |
| 1 1 0 | 8 | 4, 5, 7 | 1, 3, 6 | 2 |
| 1 1 1 | 7 | 3, 6, 8 | 2, 4, 5 | 1 |

It will be noted from Table II above that for any combination of input signals A, B and C applied to the matrix of FIG. 7, one and only one of the eight cores 1 through 8 receives sufficient current (I) to switch the core. For each input combination, the algebraic sum of the currents threading each of the other cores is either zero or a half-select current pulse of one polarity or the other.

It will be noted, of course, that since the half-select current pulses from input sources A and B are of opposing polarity, there can be no combination of A and B input signals which will result in sufficient current (I) to switch a core. Thus, no switching action will occur within the matrix with only A and B inputs present.

In FIG. 9 is shown the mirror chart equivalent of the core plane shown schematically in FIG. 7, the only difference being that in the mirror chart presentation it is more convenient to assume that all select-winding current drivers supply current of the same (positive) polarity, the opposing magetizing force for the B windings being achieved by threading the B windings in opposite sense relative to the A and C windings. This is indicated in FIG. 9 by the relative slopes of the slant lines.

Referring now to FIG. 9, it will be seen that select winding $A_0$ threads cores 1, 2, 3 and 4; select winding $A_1$ threads cores 5, 6, 7 and 8; select winding $B_0$ threads cores 1, 2, 5 and 6; and so on, as shown. It is assumed that the current in the A, B and C select windings flows in each case from left to right to produce, in the case of the A and C windings, an "upward" magnetizing force, and in the case of the B winding, a "downward" magnetizing force. In the S (sum) and C (carry) windings, the voltages induced therein by the switching of a core is, in each case, of a polarity to drive current from left to right. The applied reset pulse also drives current from left to right.

Having in mind the slight difference indicated above, consider FIG. 7. Assume, for example, that addend $A=1$ and that augend $B=1$. Assume further, that there is no input signal from carry source C. It will be seen from Table I that, under these assumed conditions, a positive half-select current pulse will be supplied to the $A_1$ select winding, a negative half-select pulse to the $B_0$ select winding, and zero current to the $A_0$, $B_1$, $C_0$ and $C_1$ windings. Thus, in the upper row of cores of FIG. 7 a net current of $-I/2$ will be passing through cores 1 and 2 while a net current of zero will be passing through cores 3 and 4. In the lower row of cores of FIG. 7, zero net current will be passing through cores 5 and 6, and a net current of $+I/2$ through cores 7 and 8. It will be seen, then, that as a result of the application of current pulses from addend and augend sources A and B to the $A_1$ and $B_0$ leads, two of the cores (7 and 8) of the matrix have a net positive current of half-select value flowing in their windings. Assume now that a carry signal from source C is applied to one of its two leads prior to the termination of the current pulses on the $A_1$ and $B_0$ leads so that there is a period of coincidence among the three input signals. Under this condition, one of the two half-selected cores 7 and 8 will be fully selected, since a net value of current $I$ will be passing through the windings of one of the two cores. Such core will receive a total magnetizing force of $+H_2$ (see FIG. 8) and such core will be switched. For example, if carry $C=1$, that a current pulse of magnitude $I/2$ will appear on lead $C_1$ and net current through the windings of core 7 will be $I/2+I/2$ or $I$. Thus, core 7 will be switched. None of the other cores, however, will switch since none of the other cores is receiving full current $I$. See Table II above.

When core 7 switches, an output voltage is induced in the $S_1$ (Sum=1) sense lead and also in the $C_1$ (Carry=1) sense lead, both of which thread through core 7. It will be shown below, in Tables III and IV, that whenever the binary sum of the three input signals from sources A, B and C is equal to binary 1, one of four cores 2, 4, 5 or 7), and none other, will switch. Accordingly, the $S_1$ sense lead is threaded through cores 2, 4 and 5, in addition to core 7. Similarly, it will be shown that one of four cores (3, 6, 7 and 8), and none other, will switch when the three input signals produce a carry output signal equal to binary 1, and, accordingly, the $C_1$ sense lead is threaded through cores 3, 6 and 8, in addition to core 7.

In like manner, the $S_0$ (Sum=0) sense lead and the $C_0$ (Carry=0) sense lead are each threaded through four cores, since, as is shown in Tables III and IV, one of four cores identified therein is switched when the binary Sum=0, and one of four is switched when the binary Carry=0.

Table III below shows, for the various combinations of binary input signals to be added, the binary sum and the binary carry. Table III also identifies by number, for each combination of input signals, the one core of the core plane of FIGS. 7 and 9 which switches. This core is, of course, the same as that indicated in Table II above.

*Table III*

| Input | | | Output | | Core of FIGS. 7 and 9 which switches |
|---|---|---|---|---|---|
| A | B | C | Sum | Carry | |
| 0 | 0 | 0 | 0 | 0 | 1 |
| 0 | 0 | 1 | 1 | 0 | 2 |
| 0 | 1 | 0 | 1 | 0 | 4 |
| 0 | 1 | 1 | 0 | 1 | 3 |
| 1 | 0 | 0 | 1 | 0 | 5 |
| 1 | 0 | 1 | 0 | 1 | 6 |
| 1 | 1 | 0 | 0 | 1 | 8 |
| 1 | 1 | 1 | 1 | 1 | 7 |

Table IV below summarizes, for the various outputs, i.e., for the sum and carry outputs shown in Table III, the cores which switch. Consequently, these are the cores which, in the core plane of FIG. 7 are threaded by sense leads leading to the "Sum=0," "Sum=1," "Carry=0" and "Carry=1" output terminals.

*Table IV*

| Output | Obtained from cores |
|---|---|
| Sum 0 | 1 3 6 8 |
| Sum 1 | 2 4 5 7 |
| Carry 0 | 1 2 4 5 |
| Carry 1 | 3 6 7 8 |

The operation of the binary adder core plane shown in FIGS. 7 and 9 may be summarized as follows: For each operation of addition, a current pulse is furnished, by each of the three sources A, B and C, to one of the two leads connecting each source to the core plane. Each current pulse is of half-select magnitude. The magnetizing force established in any core due to the augend (B) current pulse is of opposite polarity from that established by the addend (A) and carry (C) pulse. For each combination of three input signals, one and only one core of the core plane receives sufficient current ($I$) to switch. It is not necessary that all three input current pulses begin or end at the same time, but it is necessary that there be coincidence among them during some time period. Each of the eight cores is threaded by two sense windings, one a sum winding and the other a carry winding. There are two types of sum sense windings, one representing Sum=0 and the other representing Sum=1. There are also two types of carry sense windings, one representing Carry=0 and the other representing Carry=1. Output signals are available on the sense leads substantially simultaneously with the switching of the core; thus, there is no appreciable delay between input and output signals. The circuit parameters are so chosen that the magnitude of the current which is driven through a sense lead, as a result of the voltage induced in a sense winding when a core switches, is small relative to that of a half-select current pulse, so that no magnetizing force of substantial magnitude, relative to that of $H_1$ of FIG. 8, is induced in the non-switched cores which are threaded by the same sense lead.

Resetting of the core plane of FIGS. 7 and 9 may be accomplished by pulsing the reset lead with a current of magnitude $I$. However, the use of a reset lead is not essential since, if desired, the input windings may be utilized for reset purposes. For example, if both the addend input leads were pulsed with a current of magnitude $I$, reset of all cores would be effected. Alternatively, all of the cores could be reset by applying current pulses of magnitude $I/2$ simultaneously to the four leads which connect the addend and carry sources to the core plane.

Referring now to FIG. 10 there is shown diagrammatically a parallel asynchronous adder comprising a plurality of adder core planes, each of which is substantially similar to the adder core plane of FIGS. 7 and 9. It will be understood that for simplicity only three planes have been shown in FIG. 10 and that, in practice, the asynchronous adder may comprise a substantially larger number of planes. Then A and B input current pulses from the various addend and augent sources are applied, simultaneously if desired, to their respective core planes, and simultaneously, or at least well prior to the termination of the A and B pulses, a current pulse of magnitude $I/2$ is applied to the start lead of the LSD (least significant digit) core plane to start the adding operation, the start signal being equivalent to a $C_0$ (Carry=0) pulse. One of the eight cores of the LSD core plane will switch, thus producing an output signal in one of the two sum sense leads $S_0$ or $S_1$ and also in one of the two carry sense leads $C_0$ or $C_1$. The sum signal may be taken off and immediately used, as by application to a sum storage flip flop $FF_L$. The carry output signal from the LSD core plane is amplified in the interstage amplifier, and the amplified C pulse is used as the carry input signal to the core plane of the next highest order, which in FIG. 10 is represented by the intermediate adder plane. This carry pulse arrives at the intermediate core plane prior to the termination of the A and B input signals applied to that plane so that there is coincidence among the three input signals to the intermediate core plane. One of the eight cores of the intermediate core plane will switch, and sum and carry output signals will be produced in the S and C sense windings of this plane. The sum signal may be taken off and applied to sum storage flip flop $FF_I$. The carry signal is amplified in one of the interstage amplifiers and applied to the next adder core plane (in FIG. 10 the MSD plane) prior to the termination of the A and B current pulses applied to that plane. Thus, one of the eight cores of the MSD (most significant digit) core plane will switch. It will be understood that where there are several or many intermediate planes between the LSD and MSD planes, the action described above continues down the line until the output of the most significant digit is generated in, and taken from, the MSD plane. All of the adder core planes may then be reset, by means not shown, and another addition made. When the selected core is reset, a voltage is induced in the sense windings which is opposite in polarity to that induced when the core was selected. The voltage induced on reset is ordinarily not used and does not pass through the interstage or output amplifiers; of course, this voltage may be used, if desired.

It will be clear from what has been said above that the operation of the parallel asynchronous adder of FIG. 10 requires that at each adder core plane there be a period of coincidence among the applied A, B and C signals. This is illustrated in FIG. 11 where waveforms A and B represent the A and B current pulses applied to each of the adder elements. It is assumed for the purpose of this explanation that the A and B pulses are applied simultaneously to all the core planes, although this is not essential. The time of application of the leading edge of the A and B pulses is identified in FIG. 11 as time $t_1$. It is also assumed that the "start add" signal is applied to the LSD core plane simultaneously with the application of the A and B signals, the "start add" signal being identified in FIG. 11 as "$C_{START}$." The C output pulse developed in the LSD core plane and applied by way of an interstage amplifier to the intermediate core plane, and identified in FIG. 11 as "$C_I$," is delayed slightly in the amplifier and arrives at the intermediate core plane at time $t_2$ slightly later than time $t_1$. Similarly, the C output pulse developed in the intermediate core plane and applied by way of an interstage amplifier to the next intermediate core plane (not shown in FIG. 10), and identified in FIG. 11 as "$C_{I2}$" arrives at the following core plane at time $t_3$, slightly later than time $t_2$. And so until the $C_N$ output pulse developed in the next to last core plane arrives at the last or MSD core plane at time $t_n$, later than time $t_3$ but earlier than the time $t_t$ at which the A and B input pulses at the MSD plane terminate. Thus, in each plane, the C pulse is coincident, at least for a significant time period, with the A and B input signals.

In summary of the foregoing, it will be seen that the amplified output of one core plane may be used as the input to the next plane, and so on down a chain of planes, so that chains of logical operations may be performed without references to a clock source. It will also be seen that the selection scheme in each core plane is a combined coincidence anti-coincidence scheme. The sign reversal for the B windings is preferably accomplished by reversing the sense of the B winding relative to those of the A and C windings so that similar drivers may be used for all input sources. As has already been noted, the C current pulse must be coincident with at least a portion of the A and B pulses. This is not a disadvantage because the C signal is the carry from the next lower order in a parallel adder, or the carry memory in a serial realization, and presumably cannot exist before all variables are present. It will further be observed that the presence of the A and B signals at any core plane is ineffective to set a core in that plane, and that no core is set in the plane until the carry signal generated by the next lower order arrives. Upon arrival of the carry signal, sufficient net current will flow through the windings of one, and only one, of the cores of the plane to switch the core. When the core switches, a voltage will be induced in one of the carry sense windings and one of the sum sense windings. The carry signal thus induced, triggers the next higher order core plane. Carry signals propagate to the left in this manner until all stages have been set. The cores thus set retain the result until reset. Signal voltages are available on the sum leads during both the setting and the resetting operations. The A and B current drivers are preferably designed to have a signal duration equal to the maximum addition time, thereby to avoid input sequencing problems.

Thus far, the operation of the system of the present invention has been described generally, and also specifically in connection with a binary adder. The system is, of course, also applicable to binary subtraction since these two operations differ only in the generation of the carry function, which in subtraction is called "the borrow function." A function table for subtraction is shown in FIG. 12. If desired, the subtraction borrow winding may be built into the adder plane so that one plane may then perform the two basic arithmetic functions of addition and subtraction by merely selecting the carry or borrow outputs as appropriate.

By expanding the 2 x 4 core plane previously described to a 4 x 4 core plane and adding one additional input signal, it is possible to construct a combined adder-subtractor plane. The function table for the four binary variables for combined addition and subtraction is shown in FIG. 13. The driving scheme used in this combined adder-subtractor is shown in Table V below.

*Table V*

| Input condition | Drive current on each input lead |
|---|---|
| Addend A=0 | $A_0=I/2$; $A_1=0$. |
| Addend A=1 | $A_0=0$; $A_1=I/2$. |
| No addend signal | $A_0=0$; $A_1=0$. |
| Augend B=0 | $B_0=0$; $B_1=-I/2$. |
| Augend B=1 | $B_0=-I/2$; $B_1=0$. |
| No augend signal | $B_0=0$; $B_1=0$. |
| Carry or Borrow C=0 | $C_0=I/2$; $C_1=0$. |
| Carry or Borrow C=1 | $C_0=0$; $C_1=I/2$. |
| No carry or borrow signal | $C_0=0$; $C_1=0$. |
| Add D=0 | $D_0=0$; $D_1=-I/2$. |
| Subtract D=1 | $D_0=-I/2$; $D_1=0$. |
| No add or subtract signal | $D_0=0$; $D_1=0$. |

The additional input signal required in the combined adder-subtractor plane is identified above as the D signal.

By preventing core switching in one or the other of the two 2 x 4 planes of which the 4 x 4 combined adder-subtractor plane is comprised, the D signal controls whether the operation performed is addition or subtraction.

Shown in FIG. 14 is the mirror chart for the combined adder-subtractor core plane. In the operation of this core plane, as in the adder core plane already discussed, it is necessary that the C input signal be coincident with the input variables, in this case A, B and D, during at least a significant portion of the input variable signals.

The system of the present invention may also be used for comparison of two binary numbers. One method of determining the equality or inequality of two binary numbers is to compare the numbers in successive digit positions beginning with the most significant digits. If the numbers in corresponding digit positions are equal, the next most significant pair is tested, and so on. The operation preferably stops with the detection of the first inequality. The function table for comparison of two binary numbers is shown in FIG. 15. Note that the values of the functions (shown in the centers of the blocks) are not numerical quantities, but are logical statements.

A mirror chart showing three of the planes of a parallel binary comparator is shown in FIG. 16. The selection requirements are somewhat different than those of binary addition and subtraction. In the binary comparator, a core is not to be selected in a plane until both variables A and B and an equality signal from the next higher order plane are present. A half-select system that fulfills these requirements is again a combined anti-coincidence, coincidence system. The driving current scheme is shown in Table VI below.

*Table VI*

| Input condition | Drive current on each input lead |
|---|---|
| A=0 | $A_0=I/2$; $A_1=0$. |
| A=1 | $A_0=0$; $A_1=I/2$. |
| B=0 | $B_0=0$; $B_1=I/2$. |
| B=1 | $B_0=-I/2$; $B_1=0$. |
| C=0 | $C=0$. |
| C=1 | $C=I/2$. |

In Table VI above, and in the mirror chart of FIG. 16, the A and B input signals represent the binary digits to be compared. The C input signal is the equality input signal to each stage after the $n$th or MSD (most significant digit) stage. In the case of the MSD stage, the C signal is the start signal. It will be seen from the driving current scheme in Table VI that no core will switch with only A and/or B present. A core will switch, however, upon the arrival of a C equality signal. It is also true that a core may be switched if A and C are present simultaneously with B absent. This is somewhat of a disadvantage. However, in most systems at least, the variables to be compared would arrive at the comparator inputs before the operation was started.

The mirror chart shown in FIG. 16 operates as follows: A current pulse into the C winding of the $n$th or MSD plane starts the process, assuming all A and B input quantities are present. If the two input quanitites are equal, one of the two cores representing equality (Core 1 or 4) is set. The setting of this core induces a pulse in the E (equality) sense winding of the MSD plane. This pulse is amplified and is used to trigger the next lower order plane. An output signal on the E sense winding of the LSD (least significant digit) stage indicates the end of the comparison and the fact that the two numbers being compared are equal. If, a any plane, A is not equal to B, a pulse will appear on one of the two inequality sense windings, A>B or A<B, and the process will halt before all stages have been triggered. If desired, the two inequality windings may be replaced with a single winding representing merely that A is not equal to B without indicating whether A is a larger or smaller than B.

The basic technique of the present invention may also be utilized to make an accumulator from the basic adder plane. Accumulation is performed by adding the contents of the adder plane to the input quantity. This operation is accomplished by connecting the sum output leads of each plane to either the A or B input terminals of the same plane.

FIG. 17 is a block diagram showing two stages of a multi-stage accumulator, the additional stages not being shown. In FIG. 17, the sum outputs $S_0$ and $S_1$ of each plane are shown to be applied to the $A_0$ and $A_1$ input terminals, respectively, of the same plane. The operation is as follows: Upon completion of an addition operation, one core in each plane is in a "set" state and all of the other cores in each plane are in the reset state. The one core in each of the planes which is "set" represents the contents of the accumulator. The next addition operation begins with the resetting of all cores by a control pulse. A winding common to all cores ordinarily serves as the reset winding. When the "set" core in each plane is reset, a voltage is induced in one of the sum sense windings $S_1$ or $S_0$ of the plane. This voltage, which will be referred to as the sum signal, is delayed in the sum output driver circuit to allow sufficient time for all cores to reset. This delay is necessary, or at least desirable, in order to avoid the possibility of cancellation of the reset pulse by the sum signal pulse applied to one of the input terminals. After removal of the reset signal, and at a time approximately coincident with the appearance of the delayed sum signal at the A input terminal, the contents of the input register (not shown) are applied to the B input terminals of the accumulator and simultaneously the carry drivers are triggered. The addition will propagate to the left by way of the carry output circuits $C_0$ or $C_1$ until the addition operation is completed. The accumulator is then ready to accept another input quantity. The interstage drivers are so arranged that the sum drivers respond to positive pulses only, and the sum sense windings are arranged to present positive signals to the sum drivers only during reset of the cores. The carry drivers, on the other hand, are arranged to respond only to negative pulses, and the carry sense windings are so arranged on the cores that negative carry signals are induced on the carry sense windings only during setting of the cores.

It should be understood that the delay introduced in the sum signal driver circuit may be either a delay external of the drive circuitry proper or may be the inherent delay in the driver circuitry. As previously indicated, such delay is introduced to prevent interference between the reset pulse and the output from the sum driver which becomes the input to the A leads. The duration of the delay is a function of the reset pulse duration. If a large-amplitude short-duration reset pulse is used, the switching time is shortened and the delay required is reduced.

An alternate approach would be to use the sum output signal to drive the B input leads to the adder plane. Since the B input signals are of opposite polarity from those of the A, and assuming this is achieved by having the B windings oppositely wound from those of the A, it will be seen that the sum driver output would aid the reset pulse and partial reset could not occur. Hence, delayed input of the sum signal would not be required, but the duration of the sum driver output would then have to be increased so that the B input signal would persist beyond the termination of the reset pulse. In this alternative arrangement, a large-amplitude short-duration reset pulse would again be desirable.

It will be understood that in the accumulator of FIG. 17, as in the adder and other devices hereinbefore described, the sum and carry driver circuits are designed to provide to the A and C input leads current pulses of magnitude $I/2$.

It will have been noted that the foregoing description of the accumulator of FIG. 17 describes the action which takes place when an item is added to other items which are already in the accumulator. It might be well to also describe briefly the action of setting up the accumulator for the insertion of the first item. The accumulator may be first cleared by applying a signal to the "Reset" terminals of each core plane. Then a signal is applied to the "0 Set" terminal of each plane to 'set' the one core in each plane which corresponds to Addend=0, Augend=0, Carry=0. Assuming the plane to be similar to that of FIGS. 7 and 9, previously described, core 1 in each plane would be set, as will be seen from Tables II and III, previously given. The contents of the accumulator now represents a total of zero. A signal is next applied to the "Reset" terminal of each plane and an output pulse is induced in the $S_0$ output winding of each plane and passed through the associated amplifier-driver and delay line to the $A_0$ input winding. At about the time of arrival of the $A_0$ signal, the B input registers are triggered and, in the plane of the least significant digit (not shown in FIG. 17) a signal is simultaneously applied to the $C_0$ input terminal. Such a terminal may be seen in FIG. 10 at the LSD plane. The coincidence of the three signals $A_0$, B and $C_0$ at the LSD plane of the accumulator is effective to switch a core corresponding to the B input information and a signal voltage is induced in the $C_0$ output lead and passed through the associated-driver to the $C_0$ input lead of the next plane. This $C_0$ signal arrives at the next plane during the presence of the $A_0$ and B input signals and a core corresponding to the B input information is switched in that plane. This, in turn, is effective to induce an output voltage in a carry winding and so on. In this manner, the information propagates down the chain of planes and the initial item is entered into the accumulator register.

Thus far, the basic concept of the present invention has been specifically described as applied to binary devices. However, the concept is also applicable to number bases other than two. To illustrate this fact, the biquinary coded decimal adder will be briefly described. The biquinary adder offers the advantage that conversion from decimal to biquinary representation is particularly easy and in that the adder for this decimal representation system requires the least number of drivers per stage. The decimal, biquinary and 7-bit binary codes are shown in Table VII below.

*Table VII*

| Decimal | Biquinary | | 7-bit binary |
|---|---|---|---|
| | | | 5 0   4 3 2 1 0 |
| 0 | 0 | 0 | 0 1   0 0 0 0 1 |
| 1 | 0 | 1 | 0 1   0 0 0 1 0 |
| 2 | 0 | 2 | 0 1   0 0 1 0 0 |
| 3 | 0 | 3 | 0 1   0 1 0 0 0 |
| 4 | 0 | 4 | 0 1   1 0 0 0 0 |
| 5 | 1 | 0 | 1 0   0 0 0 0 1 |
| 6 | 1 | 1 | 1 0   0 0 0 1 0 |
| 7 | 1 | 2 | 1 0   0 0 1 0 0 |
| 8 | 1 | 3 | 1 0   0 1 0 0 0 |
| 9 | 1 | 4 | 1 0   1 0 0 0 0 |

Two function tables are required for the biquinary addition, one for the "bi" part and another for the "qui" part. These function tables are shown in FIG. 18. Similarly, two core planes are required, one for the "bi" and one for the "qui." The drive current requirements are as follows:

"BI" PLANE

| Input condition | Drive current |
|---|---|
| A=0 | $A_0=I/2$; $A_5=0$. |
| A=5 | $A_0=0$; $A_5=I/2$. |
| No A signal | $A_0=0$; $A_5=0$. |
| B=0 | $B_0=0$; $B_5=-I/2$. |
| B=5 | $B_0=-I/2$; $B_5=0$. |
| No B signal | $B_0=0$; $B_5=0$. |
| C=0 | $C_0=I/2$; $C_1=0$. |
| C=1 | $C_0=0$; $C_1=I/2$. |
| No C signal | $C_0=0$; $C_1=0$. |

"QUI" PLANE

In the case of windings A and $d$, the winding corresponding to the input value is driven with $I/2$; all other A and $d$ windings are driven with zero current.

In the case of the B windings, all windings except the one corresponding to the input value are driven with $-I/2$; the other B winding is driven with zero current.

Figure 19:
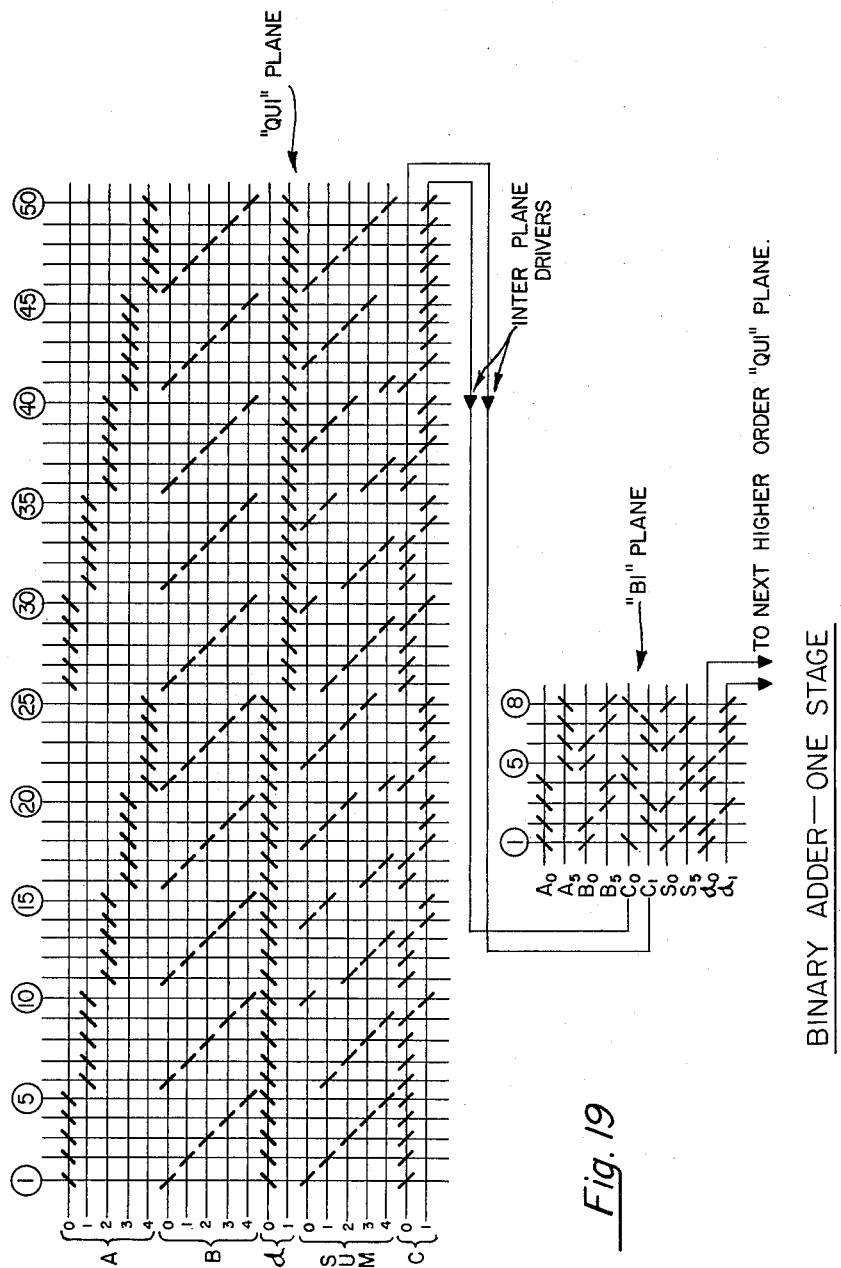
FIG. 19 is a mirror chart of a biquinary adder.

The "qui" and "bi" core planes are shown in mirror-chart form in FIG. 19. An inspection of the "qui" and "bi" planes of FIG. 19 will show that they correspond to the "qui" and "bi" addition tables of FIG. 18. Note that in the "qui" addition table of FIG. 18, all of the blocks to the left of the heavy solid line represent positions whose carry value is 0, while all of the blocks to the right of the heavy solid line represent positions whose carry value is 1. And, of course, in the core plane of FIG. 19, the cores which upon switching induce an output signal in the sense winding corresponding to Carry=1 are those cores whose numbers correspond to the positions to the right of the heavy line in the addition table of FIG. 18, for example, 10, 14, 15, 18, 19, 20 and so on.

It is believed that the operation of the biquinary adder will be apparent from what has already been said. A few examples may be helpful. It will be seen from Table VII that the sum, for example, of 4 and 2 (=6) in the decimal code corresponds in the binary code to "bi"=1, "qui"=1. Assuming no carry $d$ from a preceding addition, the core in the biquinary adder plane of FIG. 19 which switches when A=4, B=2, $d=0$ is core 23. Note from FIG. 19 that the switching of core 23 produces an output signal on sense windings, Sum=1, Carry=1. If there were a carry $d$ of 1 from the preceding addition, then in response to input signals of A=4, B=2, $d=1$, core 48 would switch and output signals would be produced on the sense windings, Sum=2, Carry=1. To cite one more example, if A=1, B=1 and $d=0$ then the core which would switch is core 7 and an output signal would be produced on output windings corresponding to Sum=2, Carry=0. However, if A=1, B=1 and $d=1$, then the core which is switched is core 32, and an output signal is produced on output windings corresponding to Sum=3, Carry=0.

It should perhaps also be mentioned that where interstage drivers are used, as in the circuits shown in FIGS. 5, 10, 16, 17 and 19, if phase inversion of the signal is not wanted, such inversion is readily avoided as by employing two amplifiers in cascade, the first of which may conveniently be a voltage amplifier and the second a current generator.

What is claimed is:

1. An asynchronous binary adder comprising: a plurality of substantially similar core planes, each core plane comprising magnetic cores arranged electrically in a 2 x 4 matrix of two rows and four columns each, each of said cores having a substantially rectangular hysteresis characteristic and being capable of assuming either of two stable states of magnetic remanence; a first input winding serially threading the four cores of the first row of each core plane; a second input winding serially threading the four cores of the second row of each core plane; means for applying a first pulse signal selectively to either said first or second input winding of each core plane to condition the cores of one of said rows by subjecting said cores to a magnetizing force of less than coercive value and of one polarity, said first pulse signal representing one of two binary digits to be added; a third input winding having two parallel branches one of which serially threads the two cores of the first column and the other of which serially threads the two cores of the second column of each core plane; a fourth input winding having two parallel branches one of which serially threads the two cores of the third column and the other of which serially threads the two cores of the fourth column of each core plane; means for applying a second pulse signal selectively to either said third or fourth input winding of each core plane to condition the cores threaded thereby by subjecting said cores to magnetizing force of less than coercive value and of a polarity opposite to that of said one polarity, said second pulse signal representing the other of said two binary digits to be added; a fifth input winding having two parallel branches one of which serially threads the two cores of the first column and the other of which serially threads the two cores of the fourth column of each core plane; a sixth input winding having two parallel branches one of which serially threads the two cores of the second column and the other of which serially threads the two cores of the third column of each core plane; means for applying a third pulse signal to either said fifth or sixth winding of each core plane to subject the cores threaded thereby to a magnetizing force of less than coercive value and of said one polarity, said third pulse signal representing either a start signal or the carry digit from a preceding core plane, the magnitude of the magnetizing forces establishing by said first, second and third signals being such that the combination of two magnetizing forces of like polarity if unopposed by a force of opposing polarity provides a net magnetizing force sufficient to switch the core, whereby in response to the at least part time coincidence of signals applied to a core plane from said first, second and third sources only a single core in the core plane is switched from one of its stable states to the other; four output windings selectively threading different combinations of cores in each core plane, each combination comprising those cores representing similar sum or carry values, said output windings having a signal voltage induced therein by the switching of a core threaded thereby, the output signal induced in a "carry" output winding of one core plane being applied to the next succeeding core plane as the third input signal thereof, said carry signal being applied to said next core plane in at least part time coincidence with the application thereto of said first and second signals representing addend and augend digits; and utilization means for utilizing the signals induced in the "sum" output windings of each core plane as the sum output of the binary adder.

2. Apparatus as claimed in claim 1 characterized in that reset means are provided for resetting all of the cores of the planes to a reference state prior to the start of an adding operation.

3. An asynchronous binary adder comprising: a plurality of substantially similar core planes, each core plane comprising a group of magnetic cores arranged electrically in a matrix of rows and columns, each of said cores having a substantially rectangular hysteresis characteristic and capable of being switched from one stable state of magnetic remanence to another; a plurality of input windings for each core plane, each of said input windings threading a different combination of cores in the plane; means for applying first input signals concurrently to a first input winding of each core plane, said first input signals corresponding to addend digits, each first input signal being of one polarity and of a magnitude insufficient by itself to switch a core; means for applying second input signals concurrently to a second input winding of each core plane, said second input signals corresponding to augend digits, each second input signal being of a polarity opposite to said one polarity and of a magnitude insufficient by itself to switch a core; means for applying third input signals to a third input winding of each core plane, the third input signal applied to the first core plane corresponding to a start signal, each third input signal being of a magnitude insufficient by itself to switch a core, the third input signals applied to each following core plane being induced in the preceding core plane, the plurality of input windings of each core plane being so threaded through the cores of the plane and the input signals applied thereto being of such magnitude and polarity that in response to the concurrent application of first, second and third signals to the respective input windings of a core plane only one of the cores in the plane is switched from one state to the other; a plurality of output windings for each core plane in which a signal voltage is induced when a core threaded thereby switches, each of said output windings threading a different combination of cores in the plane, said output windings including windings corresponding to the binary totals, Sum=0, Sum=1, Carry=0 and Carry=1; means for applying the output signals induced in the "carry" output windings of each core plane except the last core plane to a third input winding of the next following core plane prior to the termination thereat of said first and second input signals; and utilization means for utilizing the signal voltages induced in the "sum" output windings of each core plane.

4. An asynchronous arithmetic system comprising: a plurality of substantially similar core planes, each core plane comprising a plurality of magnetic cores arranged electrically in a coordinate array of two rows and N columns, each magnetic core having a substantially rectangular hysteresis characteristic and being capable of being switched from one to the other of two stable states of magnetic remanence by a magnetizing force in excess of coercive value; a separate input winding for each row of cores, each of said row windings serially threading all of the cores of one row; means for applying concurrently a first input signal selectively to one of the row windings of each core plane to apply a magnetizing force of one polarity and of less than coercive value to the row cores threaded thereby, thereby to condition said row cores; a first input winding having $N/2$ parallel branches, each of said branches threading all of the cores of one column; a second input winding having $N/2$ parallel branches, each of said branches threading all of the cores of one column, said branches of said second winding threading only columns not threaded by said branches of said first winding; means for applying concurrently a second input signal selectively to one of said first or second windings of each core plane to apply a magnetizing force of other polarity and of less than coercive value to the cores threaded thereby, thereby to condition said cores; a third input winding having $N/2$ parallel branches, each of said parallel branches threading all of the cores of one column; a fourth input winding having $N/2$ branches, each of said branches threading all of the cores of one column, the columns threaded by said fourth winding being different from the columns threaded by said third winding; a plurality of output windings for each core plane, said output windings selectively threading different cores of the plane for developing, in response to the switching of a core threaded thereby, signals corresponding to different arithmetic or logical values; and means for applying a third input signal selectively to one of said third or fourth input windings of each core plane to apply a magnetizing force of less than coercive value and of a polarity which is the same as that applied by one of said first or second signal means, said first, second and third input signals being so applied that in response to their concurrent application only one core receives sufficient magnetizing force to switch the core from one of its bistable states, to the other, said third-signal input means including means for sensing the signals developed in at least one of the output windings of a preceding core plane and for applying said sensed output signal to a following core plane as the third input signal thereof, said third input signal being applied to said following core plane before termination thereat of said first and second input signals.

5. Apparatus as claimed in claim 4 characterized in that utilization means are provided for utilizing signals developed in the output windings of the individual core planes.

6. An asynchronous arithmetical or logical system comprising: a plurality of substantially similar core planes, each core plane comprising a plurality of magnetic cores arranged electrically in a matrix of rows and columns, each of said cores having a substantially rectangular hysteresis characteristic and capable of being switched from one to the other of two stable states of magnetic remanence by a magnetizing force in excess of coercive value; a plurality of different input windings for each core plane, said input windings threading different combinations of cores within the plane; means for applying first, second and third input signals to different ones of said input windings of each core plane, said first, second and third input signals corresponding to input variables to be arithmetically or logically combined, each one of said input signals establishing a magnetizing force of less than coercive value and of one polartiy or the other, the magnetizing force created by said first and second input signals being of opposite polarity, said input windings being so arranged and said input signals being of such magnitude and polarity that in response to the at least part time coincidence of said three input signals at one core plane only one core of said plane is switched; a plurality of output windings for each core plane, said output windings threading different combinations of cores within the plane, there being a different output winding for each different arithmetic or logical result to be obtained, a signal voltage being induced in said output winding when a core threaded thereby is switched from one of its bistable states to the other, said means for applying said third input signal to a core plane including means for applying the signal developed in the output winding of a preceding core plane to the following core plane as the third input signal thereof, said means for applying said first and second input signals to a core plane including means for applying said first and second input signals concurrently to all of said core planes, said first and second input signals being of such duration that said third input signal is received at a following core plane from a preceding core plane prior to the termination of said first and second signals at said following core plane, said third input signal from said preceding core plane enabling asynchronous operation by combining with only one of said first or second input signals to cause said only one core of the respective plane to switch; and utilization means for utilizing the signals induced in the output windings of the individual planes.

7. An asynchronous arithmetical or logical system comprising: a plurality of substantially similar core planes, each core plane comprising a plurality of magnetic cores arranged electrically in a coordinate array of rows and columns, each magnetic core having a substantially rectangular hysteresis characteristic and being capable of being switched from one to the other of two stable states of magnetic remanence by a magnetizing force in excess of coercive value, each core plane having a plurality of more than two input windings adapted to receive a plurality of more than two input signals in at least part time coincidence with each other, each input winding threading a different combination of said cores, at least some of said cores having opposing magneto-motive forces generated in their respective windings in response to said applied input signals, each of said input signals representing a binary digit to be operated on arithmetically or logically, each of said input signals being of such magnitude as to establish a magnetizing force of less than coercive value, said input signals having such magnitude and polarity that in response to the coincident application of at least portions of said plurality of input signals only a single core in a plane is switched from one of its bistable states to the other; a plurality of output windings, each output winding threading a different combination of cores in the core plane and adapted to have a signal voltage induced therein in response to the switching of a core threaded thereby; means for applying a signal induced in an output winding of one core plane to one of the input windings of an other core plane as on of the input signals applied thereto, the application of said induced signal to said other core plane occurring in time coincidence with the trailing portions of other input signals applied earlier to said other plane, said induced signal serving to switch said single core in the respective core plane to provide asynchronous operation; utilization means for utilizing output signals induced in at least some of the output windings of the individual core planes; and means for resetting the cores in each of the said planes prior to the next arithmetic or logic operation.

8. An asynchronous arithmetical or logical system comprising: a plurality of core planes, each core plane comprising a plurality of magnetic cores arranged electrically in a matrix of rows and columns, each of said cores having a substantially rectangular hysteresis characteristic and capable of being switched from one to the other of two stable states of magnetic remanence by a magnetizing force in excess of coercive value; a set of selection windings for each core plane, each of said selection windings threading a different combination of cores within the plane; means for applying during a common time period at least two input signals to at least two different selection windings of each core plane, said input signals corresponding to input variables to be arithmetically or logically combined, each one of said input signals establishing by itself a magnetizing force of less than coercive value and of one polarity or the other, the threading pattern of said selection windings and the magnitude and polarity of said input signals being such that in response to the at least part time coincidence of a plurality of such input signals at one core plane one core and only one core of said plane is switched; and a set of sense windings for each core plane, each of said sense windings threading a different combination of cores within the plane, each of said sense windings corresponding to a different arithmetic or logical result to be obtained, a signal voltage being induced in a sense winding when a core threaded thereby is switched from one of its bistable states to the other, said means for applying during a common time period at least two input signals to a core plane including means for applying as one of said input signals the signal induced in the sense winding of a preceding core plane, the one or more other input signals applied to the plane during said common time period being of such time and/or duration that said induced signal is received from said preceding core plane during the presence of said other input signals, said induced signal enabling one of said cores to switch thereby providing asynchronous operation.

9. Apparatus as claimed in claim 8 characterized in that utilization means are provided for utilizing signals induced in the sense windings of the individual core planes.

10. An asynchronous system for performing arithmetic or logical functions, said system comprising a plurality of substantially similar unit circuits, each unit circuit comprising a core plane comprised solely of bistable magnetic cores, core windings and bidirectional conductive interconnections between said core windings, each core plane having a set of selection windings through which pulses of driver currents are selectively passed, the pulse of driver current passing through a single selection winding being insufficicent to switch a core from one stable state to the other, each of said selection windings threading a different combination of cores in said plane, the threading scheme of said selection windings and the magnitude and polarity of the driver currents being such that one and only one core in the plane is switched by the passage of driving currents through two or more selection windings during a common time period, at least some of said cores having opposing magnetomotive forces generated in their respective selection windings in response to said driver currents, each core plane having a set of sense windings in which a voltage is induced when one of the cores threaded by the sense winding is switched from one of its stable states to the other, said sense voltage signal induced in said one core providing asynchronous operation; and means for including the voltage induced in a sense winding of one core plane in means for passing driver current through a selection winding of one of the other core planes during a common time period with the passage of driver currents through other of the selection windings of said other core planes.

11. In an asynchronous binary adder, a core plane comprising a plurality of magnetic cores arranged electrically in a 2 x 4 matrix of two rows and four columns, each of said cores having a substantially rectangular hysteresis characteristic and being capable of being switched from one to the other of two stable states of magnetic remanence by a magnetizing force in excess of coercive value; a first set of input windings, one of said windings serially threading the four cores of the first row and another serially threading the four cores of the second row; a second set of input windings, each of said windings having a pair of parallel branches, one pair of branches threading the cores of the first and second columns and the other threading the cores of the third and fourth columns; a third set of input windings, each of said windings having a pair of parallel branches, one pair of branches threading the cores of the first and fourth columns and the other threading the cores of the second and third columns; means for applying during a common time period first, second and third input signals to one of the windings of each of said first, second and third sets of input windings, each of said input signals being of such magnitude and polarity that each signal by itself establishes a magnetizing force of less than coercive value in the cores threaded by the winding through which said signal passes, two of said first, second and third signals being of a polarity to establish aiding magnetizing forces and one being of a polarity to establish an opposing magnetizing force, thereby to switch but one core in the plane in response to the at least part time coincidence of said first, second and third input signals; two sets of output windings, each output winding threading a different combination of cores, one set of output windings corresponding to sum values and the other corresponding to carry values, a voltage being induced in one output winding of each set in response to the switching of a core in response to the coincident application of said first, second and third input signals; means for utilizing the voltages induced in the output windings; and clearing means for resetting all of the cores of the plane.

12. An asynchronous system for performing arithmetic or logical functions, said system comprising: a plurality of substantially similar core planes, each core plane comprising a plurality of magnetic cores connected electrically in a coordinate array of rows and columns, each magnetic core having a substantially rectangular hysteresis characteristic and capable of being switched from one to the other of its two stable states of magnetic remanence by a magnetizing force in excess of coercive value; a plurality of current-driven selection windings in each core plane, each selection winding threading a different combination of cores and corresponding to one of the input variables, means for selectively applying current pulses to a plurality of selection windings of each core plane during a common time period; each current pulse being of a magnitude to establish a magnetizing force of less than coercive value in any core threaded by the selection winding carrying the pulse, at least some of said cores having opposing magnetomotive forces generated on their respective selection windings; a plurality of sense windings in each core plane in which a voltage is induced during said common time period when a core threaded thereby is switched, each sense winding corresponding to the function of the applied input variables, the said sense voltage signal induced in said latter core enabling asynchronous operation of another core plane; and means for applying a signal developed in one core plane during said common time period and representing a function thereof to an other core plane as one of the input variables applied thereto during said common time period.

References Cited in the file of this patent
UNITED STATES PATENTS

| | | |
|---|---|---|
| 2,733,860 | Rajchman | Feb. 7, 1956 |
| 2,784,391 | Rajchman | Mar. 5, 1957 |
| 2,805,020 | Lanning | Sept. 3, 1957 |
| 2,819,018 | Yetter | Jan. 7, 1958 |
| 2,844,308 | Dussine | July 22, 1958 |
| 2,844,812 | Auerback | July 22, 1958 |
| 2,922,996 | Young | Jan. 26, 1960 |

OTHER REFERENCES

Olsen: M.I.T. Report R–211, A Magnetic Matrix Switch and Its Incorporation Into a Coincident Current Memory, June 6, 1952, pp. 81 to 85, and 3 shts. drwg. showing FIGS. VI–4 to VI–6.